(12) United States Patent
Kelly et al.

(10) Patent No.: US 8,547,146 B1
(45) Date of Patent: Oct. 1, 2013

(54) OVERCURRENT BASED POWER CONTROL AND CIRCUIT RESET

(75) Inventors: John Justin Kelly, New Port Richey, FL (US); Thomas J. Bingel, Indian Rocks Beach, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/439,538

(22) Filed: Apr. 4, 2012

(51) Int. Cl.
*H03L 7/00* (2006.01)

(52) U.S. Cl.
USPC .......................................... 327/143; 327/198

(58) Field of Classification Search
USPC .......................................... 327/142, 143, 198
See application file for complete search history.

(56) References Cited

U.S. PATENT DOCUMENTS

| | | | | |
|---|---|---|---|---|
| 4,979,066 | A * | 12/1990 | Kawata et al. | 361/18 |
| 5,602,500 | A * | 2/1997 | Fournel | 327/77 |
| 5,672,918 | A | 9/1997 | Kimbrough et al. | |
| 5,898,557 | A * | 4/1999 | Baba et al. | 361/103 |
| 5,973,528 | A * | 10/1999 | Halamik et al. | 327/198 |
| 6,137,699 | A * | 10/2000 | Sakamoto | 363/50 |
| 6,350,960 | B1 * | 2/2002 | Norris | 219/121.54 |
| 6,373,671 | B1 | 4/2002 | Watanabe et al. | |
| 6,552,562 | B2 * | 4/2003 | Nagai et al. | 324/756.06 |
| 6,799,288 | B2 | 9/2004 | Kohnen et al. | |
| 7,111,180 | B2 * | 9/2006 | Vyssotski et al. | 713/300 |
| 7,423,492 | B2 | 9/2008 | Seefeldt | |
| 7,492,560 | B2 * | 2/2009 | Hussein et al. | 361/91.1 |
| 7,554,295 | B2 * | 6/2009 | Melichar | 320/132 |
| 7,659,773 | B2 * | 2/2010 | Choi et al. | 327/544 |
| 7,826,191 | B1 * | 11/2010 | Fisher et al. | 361/93.1 |
| 7,869,177 | B2 * | 1/2011 | Lee et al. | 361/93.4 |
| 8,084,886 | B2 * | 12/2011 | Hirahara | 307/64 |
| 8,218,281 | B2 * | 7/2012 | Vandergrift | 361/93.9 |
| 8,243,407 | B2 * | 8/2012 | Fukami | 361/78 |
| 8,400,745 | B1 * | 3/2013 | Zansky et al. | 361/103 |
| 2007/0131847 | A1 * | 6/2007 | Yao et al. | 250/214 R |
| 2007/0268642 | A1 * | 11/2007 | Metayer et al. | 361/93.1 |
| 2008/0043393 | A1 | 2/2008 | Petkov | |

OTHER PUBLICATIONS

European Patent Office, "European Search Report", "from Foreign Counterpart of U.S. Appl. No. 13/439,538", Jul. 4, 2013, pp. 1-4, Published in: EP.

European Patent Office, "European Office Action", "from corresponding EP Application No. 13159827.8", Jul. 17, 2013, pp. 1-4, Published in: EP.

* cited by examiner

*Primary Examiner* — William Hernandez
(74) *Attorney, Agent, or Firm* — Fogg & Powers LLC

(57) ABSTRACT

In one embodiment, a circuit is provided. The circuit includes a load configured to receive power through a power path. The circuit also includes a current monitor configured to sense a current draw on the power path. A switch on the power path is coupled in series between the load and a power rail, and a control circuit is coupled to the current monitor. The control circuit is configured to set the switch to a non-conducting state and to send a reset signal to the load if the current monitor senses an overcurrent on the power path.

20 Claims, 3 Drawing Sheets

OVERCURRENT BASED POWER CONTROL AND CIRCUIT RESET

BACKGROUND

In high-reliability systems such as spacecraft electronics systems, semiconductor devices are often susceptible to single event effects such as a single event transient (SET) due to high temperature or radiation. This problem is common when using commercial non-radiation hardened components in spacecraft electronics design. In an elevated temperature or radiation event, these non-radiation hardened components can begin to draw excessive current that can result in bringing down an entire power rail potentially causing system failure.

SUMMARY

In one embodiment, a circuit is provided. The circuit includes a load configured to receive power through a power path. The circuit also includes a current monitor configured to sense a current draw on the power path. A switch on the power path is coupled in series between the load and a power rail, and a control circuit is coupled to the current monitor. The control circuit is configured to set the switch to a non-conducting state and to send a reset signal to the load if the current monitor senses an overcurrent on the power path.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
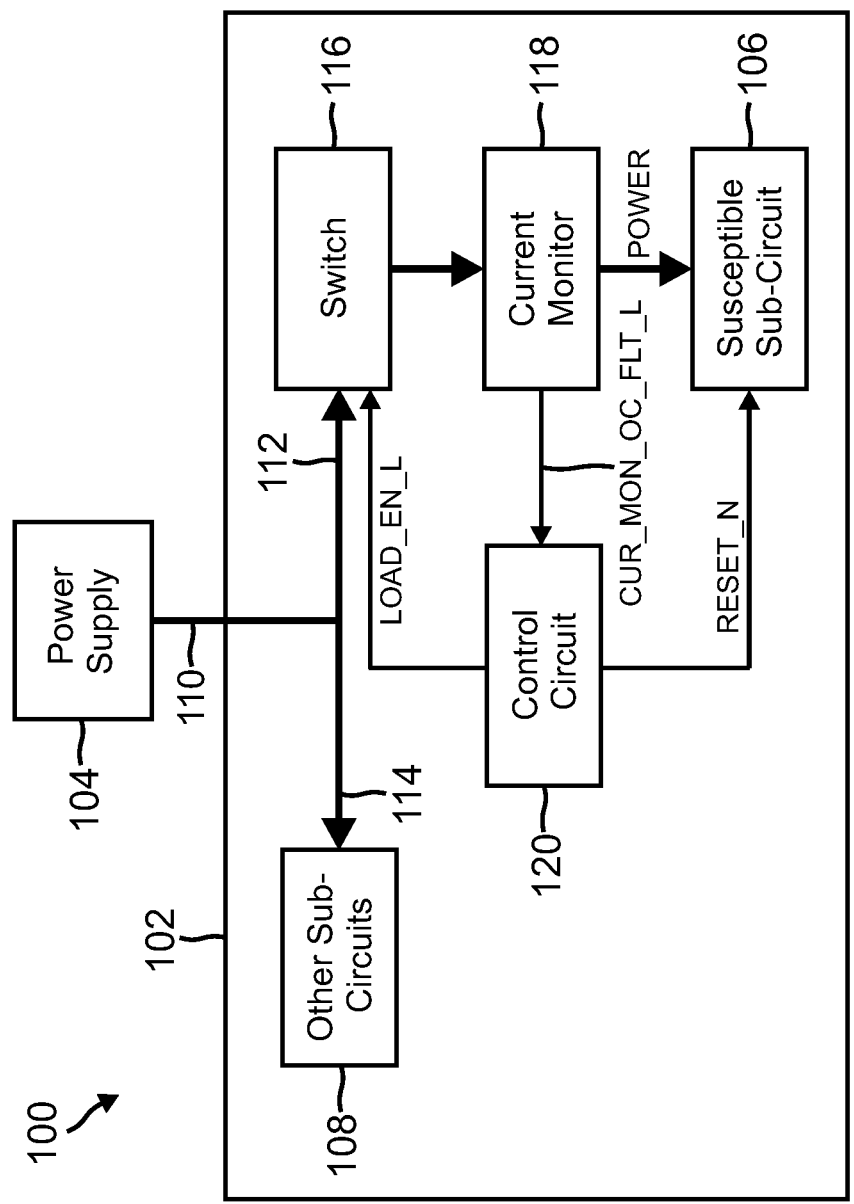
FIG. 1 is a block diagram of an example system having an overcurrent based power control and circuit reset.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an example system 100 having an overcurrent based power and control reset. The system 100 includes an electronic device 102 that receives power from a power supply 104. The power supply 104 can be any suitable power supply such as a battery, line power, or other entity that can provide power, and can be integral with or separate from the electronic device 102. The electronic device 102 can be composed of two or more functional sub-circuits (e.g., loads), shown as a susceptible sub-circuit 106 and other sub-circuits 108. The sub-circuits 106, 108 share a power rail 110 to which power is provided from the power supply 104. Individual power paths 112, 114 branch off and couple each sub-circuit respectively to the power rail 110. Power path 112 couples the susceptible sub-circuit 106 to the power rail 110 and power path 114 couples the other sub-circuits 108 to the power rail 110. In other examples, more than two power paths can be included to provide power to more than two distinct sub-circuits.

Susceptible sub-circuit 106 comprises a circuit that is prone to draw excessive current from the power rail 110. In an example, susceptible sub-circuit 106 comprises a non-radiation hardened circuit and electronic device 102 is to be used in a space environment. As a non-radiation hardened circuit used in a space environment the susceptible sub-circuit 106 is susceptible to single event effects caused by high temperature and/or radiation. This single event effects can include a single event transient (SET) which can cause the susceptible sub-circuit 106 to enter a state in which the susceptible sub-circuit 106 draws excessive current from the power rail 110.

Susceptible sub-circuit 106 is configured to be reset with an input signal. That is, susceptible sub-circuit 106 is configured such that the proper signal received at a reset input (also referred to herein as a "reset signal") causes the sub-circuit 106 to operate in reset mode. In reset mode, the susceptible sub-circuit 106 performs one or more of the following, powers down, returns to a known hardware and software state, clears its memory and drains power of components therein. Reset mode can be used to change a state of the susceptible sub-circuit 106 when the susceptible sub-circuit 106 is in a state that causes the susceptible sub-circuit 106 to draw excessive current. In particular, reset mode can be used to put the susceptible sub-circuit 106 back into a state that draws normal current levels from the power rail 110. In an example, the reset signal used to reset the susceptible circuit 106 can be a defined logic level (e.g., one of a high or a low level) at the reset input. For example, while a logic low is provided to the reset input the susceptible sub-circuit 106 operates in reset mode. If a signal other than a logic low (e.g., a logic high) is received at the reset input, the susceptible sub-circuit 106 operates in normal mode.

To mitigate the susceptibility of susceptible sub-circuit 106 to drawing excessive power from the power rail 110, a switch 116, a current monitor 118, and a control circuit 120 are included to control power and to send a reset signal to the susceptible sub-circuit 106 when an overcurrent event occurs. In an example, the switch 116, current monitor 118, and control circuit 120 are radiation hardened circuits composed of appropriate radiation hardened components.

The switch 116 is coupled on the power path 112 in series between the power supply 104 and the susceptible sub-circuit 106. When the switch 116 is in a conducting state, power from the power rail 110 is applied to the susceptible sub-circuit 106, when the switch 116 is in a non-conducting state power from the power rail 110 is cut-off from the susceptible sub-circuit 106. The switch 116 can include any suitable switching device including a transistor.

The current monitor 118 is coupled to the power path 112 and is configured to sense (e.g., monitor) a current draw on the power path 112 for the susceptible sub-circuit 106 (e.g., the current flowing between the power supply 104 and the susceptible sub-circuit 106). If an overcurrent event (e.g., the current exceeds a threshold) is sensed on the power path 112, the current monitor 118 is configured to output an overcurrent signal indicating the overcurrent event. The current monitor 118 can be implemented by any suitable circuit such as, for example, the circuit shown in FIG. 3.

The control circuit 120 is coupled to the current monitor 118 and is configured to receive the overcurrent signal from the current monitor 118. The control circuit 120 is also coupled to the switch 116 and is configured to control the switch 116 by setting the switch in either a conducting or a non-conducting state. The control circuit 106 is also coupled to the reset input of the susceptible sub-circuit 106 and is configured to send a reset signal to the reset input. The control circuit 120 can be implemented by any suitable components such as, for example, Boolean logic or a microprocessor.

In operation, the system 100 can mitigate overcurrent events as follows. If the current monitor 118 senses an overcurrent on the power path 112 to the susceptible sub-circuit 106, the current monitor 118 sends an overcurrent signal to the control circuit 120 indicating an overcurrent event. In response to receiving the overcurrent signal indicating the overcurrent event, the control circuit 120 cuts-off power to the susceptible sub-circuit 106 by setting the switch 116 in a non-conducting state. In an example, the control circuit 120 can immediately cut-off power to the susceptible sub-circuit 106 after receiving the overcurrent signal. In addition to cutting-off power to the susceptible sub-circuit 106, the control circuit 120 can send a reset signal to the susceptible sub-circuit 106 to set the susceptible sub-circuit in reset mode.

After the reset signal has been sent to the susceptible sub-circuit 106, the control circuit 106 can re-apply power to the susceptible sub-circuit 106 by setting the switch 116 back to a conducting state. In an example, the reset signal can re-apply power in response to a signal from the current monitor 118 indicating that the current level on the power path 112 has dropped to an acceptable level. Since the switch 116 has been set to a non-conducting state, the current should drop to an acceptable level quickly, resulting in the control circuit 120 quickly re-apply power to the susceptible sub-circuit 106. In another example, the control circuit 106 can hold the switch 116 in a non-conducting state for a set length of time after which the control circuit 106 sets the switch 116 back to a conducting state.

As mentioned above, the control circuit 120 can send a reset signal to the susceptible sub-circuit 106 after powering down and before powering up. Thus, when the susceptible sub-circuit 106 powers up, the susceptible sub-circuit 106 operates in reset mode in response to receiving the reset signal from the control circuit 120.

In an example, the control circuit 120 can hold the susceptible sub-circuit 106 in reset mode for a set length of time after power is re-applied to the susceptible sub-circuit 106. The control circuit 120 can hold the susceptible sub-circuit 106 in reset mode by maintaining application of the reset signal to the susceptible sub-circuit 106. In examples where the reset signal is a defined logic level, the control circuit 120 can maintain application of the defined logic level on the reset input of the susceptible sub-circuit 106. The set length of time for holding the susceptible sub-circuit in reset mode can be based on a length of time needed for the susceptible sub-circuit 106 to reset. For example, the set length of time can be based on a length of time needed to allow power within the susceptible sub-circuit 106 to drain or to enable memory within the susceptible sub-circuit 106 to be cleared and initialized.

Notably, since the other sub-circuits 108 have power paths 114 to the power rail 110 that are distinct from the power path 112, the switch 116 does not control power to the other sub-circuits 108 and the current monitor 118 does not monitor current flowing to the other sub-circuits 108. Thus, the switch 116 can be controlled based solely on the current draw of the susceptible sub-circuit 106 and cut-off power to the susceptible sub-circuit 106 without cutting-off power to the other sub-circuits 108, enabling the susceptible sub-circuit 106 to have its power cut-off and be reset while the other sub-circuits 108 maintain normal operation.

Figure 2:
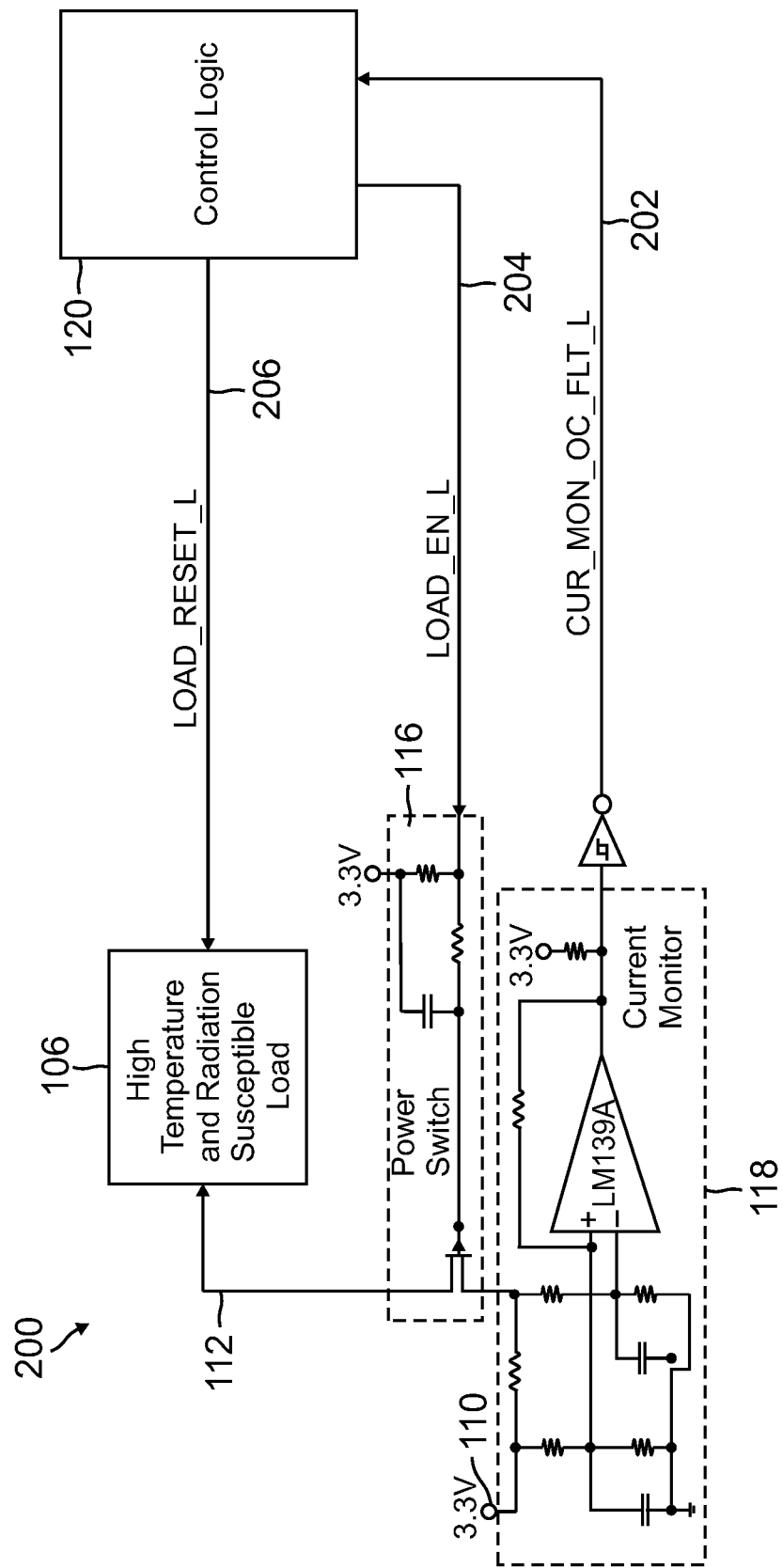
FIG. 2 is a block diagram of an example circuit for overcurrent based control and circuit reset.

FIG. 2 is a block diagram of an example circuit 200 for overcurrent based control and circuit reset. As shown, the current monitor 118 is coupled to the power path 112 for the susceptible sub-circuit 106. The current monitor 118 uses a sense resistor coupled in series between the susceptible sub-circuit 106 and the power rail 110 to sense a current on the power path 112. The current monitor 118 provides an overcurrent signal on current monitor path 202 indicating whether an overcurrent event has occurred. In an example, the overcurrent signal comprises a logic signal wherein a first logic level indicates current that exceeds a threshold and a second logic level indicates current below the threshold.

In response to an overcurrent signal indicating current that exceeds the threshold, the control circuit 120 provides a signal over a switch path 204 to the switch 116 to set the switch in a non-conducting state. As shown, the switch 116 can include a transistor that is coupled in series between the susceptible sub-circuit 106 and the power supply 104. Thus, the switch 116 can cut-off power to the susceptible sub-circuit 106. The signal from the control logic 120 can be a logic signal coupled to a gate of the transistor, wherein a first logic level sets the switch 116 in a conducting state and a second logic level set the switch 116 in non-conducting state.

The control circuit 120 also provides a reset signal over a reset path 206 to the susceptible sub-circuit 106 in response to the overcurrent signal indicating current that exceeds the threshold. As mentioned above, this reset signal can also be a logic signal. The control circuit 120 can then set the switch 116 back to a conducting state and hold the susceptible sub-circuit 106 in reset mode for a set length of time to reset the susceptible sub-circuit 106 after power is re-applied.

Figure 3:
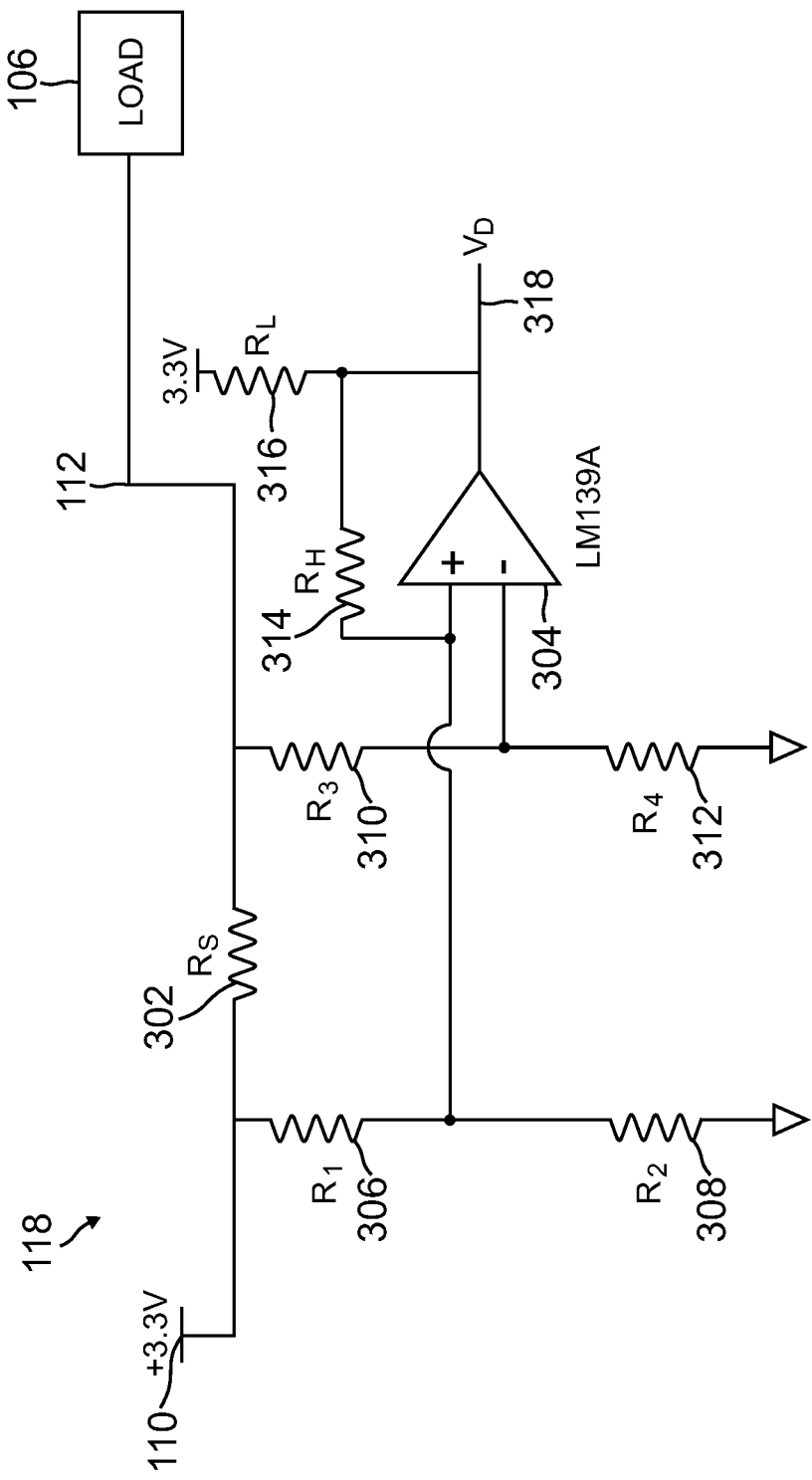
FIG. 3 is a circuit diagram of an example current monitor circuit.

FIG. 3 is a circuit diagram of an example current monitor circuit 120. The current monitor 120 includes a sense resistor 302 coupled on the power path 112 in series between the susceptible sub-circuit 106 and the power rail 110. In an example, the power rail 110 is at 3.3V and the threshold current level on the power path 112 is between 2.5-2.7 Amps. In an example, the sense resistor 302 has a resistance of around 0.1 Ohms. The current monitor 118 includes an operational amplifier 304 to sense changes in current through the sense resistor 302 and to provide an overcurrent signal indicating whether the current is above or below a threshold. The current monitor 118 also includes a first resistor 306 and a second resistor 308 coupled to provide a voltage divider for the positive input of the operational amplifier 304. In an example, the first resistor 306 and second resistor 308 are high precision, low tolerance resistors that have a resistance of between 9-11 kOhms. A third and fourth resistors 310, 312 are coupled to provide a voltage divider for the negative input of the operational amplifier 304. Similar to the first and second resistors 306, 308, the third and fourth resistors 310, 312 can be high precision, low tolerance resistors that have a resistance of between 9-11 kOhms. The current threshold is based on the ratio between the positive input and the negative input of the operational amplifier 304 and can be set based on the values of the first, second, third, and fourth resistors 306, 308, 310, 312. In an example, the current monitor 118 can include a first capacitor coupled between the positive input of the operational amplifier and ground and a second capacitor coupled between the negative input of the operational amplifier and ground. The first and second capacitor can slow variation in the inputs to the positive and negative inputs in order to reduce ripple in the output of the operational amplifier 120. The current monitor 118 can also include a hysteresis resistor 314 to provide a hysteresis thereto and another resistor 316 coupled between the power rail 110 and the output 318.

Example Embodiments

Example 1 includes a circuit comprising a load configured to receive power through a power path; a current monitor configured to sense a current draw on the power path; a switch on the power path coupled in series between the load and a power rail; and a control circuit coupled to the current monitor, wherein the control circuit is configured to set the switch to a non-conducting state and to send a reset signal to the load if the current monitor senses an overcurrent on the power path.

Example 2 includes the circuit of Example 1, wherein the load comprises a circuit configured to be reset via an input signal.

Example 3 includes the circuit of any of Examples 1 or 2, wherein upon receiving the reset signal the load is configured to one or more of: return to a known hardware and software state, power down, clear its memory, and drain power therein.

Example 4 includes the circuit of any of Examples 1-3, wherein the control circuit is configured to set the switch back to a conducting state after the reset signal is sent to the load.

Example 5 includes the circuit of Example 4, wherein the control circuit is configured to hold the load in reset mode for a set length of time after setting the switch back to a conducting state.

Example 6 includes the circuit of any of Examples 1-5, wherein the load comprises a sub-circuit within a larger circuit, and wherein the switch is configured to control power to the sub-circuit and not other sub-circuits of the larger circuit and wherein the reset signal is configured to reset the load and not the other sub-circuits of the larger circuit.

Example 7 includes the circuit of Example 6, wherein the current monitor is configured to monitor the power path to the load and not power to the other sub-circuits.

Example 8 includes the circuit of any of Examples 1-7, wherein the reset signal is configured to change a state of the load caused by a single event effect causing the load to draw excessive current.

Example 9 includes the circuit of any of Examples 1-8, wherein the current monitor, switch, and control circuit are radiation hardened circuits and wherein the load is a non-radiation hardened circuit.

Example 10 includes a system having radiation and temperature event mitigation, the system comprising a first functional sub-circuit configured to receive power from a power supply; a second functional sub-circuit configured to receive power from the power supply; a power switch coupled in series between the power supply and the second functional sub-circuit and not in series between the power supply and the first functional sub-circuit; a current monitor configured to monitor a current flowing between the power supply and the second functional sub-circuit, and to provide an overcurrent signal if the current flowing between the power supply and the second functional sub-circuit exceeds a threshold; a control circuit coupled to the current monitor and configured to set the power switch to cut-off power to the second functional sub-circuit and to send a reset signal to the second functional sub-circuit if an overcurrent signal is received from the current monitor.

Example 11 includes the system of Example 10, wherein the second functional sub-circuit is configured to be reset via an input signal.

Example 12 includes the system of any of Examples 10 or 11, wherein upon receiving a reset signal, the second functional sub-circuit is configured to one or more of: return to a known hardware and software state, power down, clear its memory, and drain power therein.

Example 13 includes the system of any of Examples 10-12, wherein the control circuit is configured to set the switch to re-apply power to the second functional sub-circuit after the reset signal is sent.

Example 14 includes the system of Example 13, wherein the control circuit is configured to hold the second functional sub-circuit in reset mode for a period of time after re-applying power to the second functional sub-circuit.

Example 15 includes the system of any of Examples 10-14, wherein the switch is configured to control power to the second functional sub-circuit and not the first functional sub-circuit and wherein the first functional sub-circuit is configured to maintain normal operation while the second functional sub-circuit is resetting.

Example 16 includes the system of any of Examples 10-15, wherein the reset signal is configured to change a state of the second functional sub-circuit caused by a single event effect causing the second functional sub-circuit to draw excessive current.

Example 17 includes the system of any of Examples 10-16, wherein the current monitor, power switch, and control circuit are radiation hardened circuits and wherein the second functional sub-circuit is a non-radiation hardened circuit.

Example 18 includes a method for mitigating radiation and temperature events, the method comprising sensing a current draw of a circuit; cutting off power to the circuit if the current draw of the circuit exceeds a threshold; and sending a reset signal to the circuit if the current draw of the circuit exceeds the threshold.

Example 19 includes the method of Example 18, comprising at the circuit, performing one or more of: returning to a known hardware and software state, powering down, clearing memory, and draining power in response to receiving the reset signal.

Example 20 includes the method of any of Examples 18 or 19, comprising maintaining normal operation of other circuits within an electronic device that share power with the circuit while cutting off power and resetting the circuit.

Example 21 includes the method of any of Examples 18-20, comprising re-applying power to the circuit after sending the reset signal.

Example 22 includes the method of Example 21, comprising holding the circuit in reset for a period of time after re-applying power to the circuit.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A circuit comprising:
a load configured to receive power through a power path;
a current monitor configured to sense a current draw on the power path;
a switch on the power path coupled in series between the load and a power rail; and
a control circuit coupled to the current monitor, wherein the control circuit is configured to set the switch to a non- conducting state and to send a reset signal to the load if the current monitor senses an overcurrent on the power path.

2. The circuit of claim 1, wherein the load comprises a circuit configured to be reset via an input signal.

3. The circuit of claim 1, wherein upon receiving the reset signal the load is configured to one or more of: return to a known hardware and software state, power down, clear its memory, and drain power therein.

4. The circuit of claim 1, wherein the control circuit is configured to set the switch back to a conducting state after the reset signal is sent to the load.

5. The circuit of claim 4, wherein the control circuit is configured to hold the load in reset mode for a set length of time after setting the switch back to a conducting state.

6. The circuit of claim 1, wherein the load comprises a sub-circuit within a larger circuit, and wherein the switch is configured to control power to the sub-circuit and not other sub-circuits of the larger circuit and wherein the reset signal is configured to reset the load and not the other sub-circuits of the larger circuit.

7. The circuit of claim 6, wherein the current monitor is configured to monitor the power path to the load and not power to the other sub-circuits.

8. The circuit of claim 1, wherein the reset signal is configured to change a state of the load caused by a single event effect causing the load to draw excessive current.

9. The circuit of claim 1, wherein the current monitor, switch, and control circuit are radiation hardened circuits and wherein the load is a non-radiation hardened circuit.

10. A system having radiation and temperature event mitigation, the system comprising:
  a first functional sub-circuit configured to receive power from a power supply;
  a second functional sub-circuit configured to receive power from the power supply;
  a power switch coupled in series between the power supply and the second functional sub-circuit and not in series between the power supply and the first functional sub-circuit;
  a current monitor configured to monitor a current flowing between the power supply and the second functional sub-circuit, and to provide an overcurrent signal if the current flowing between the power supply and the second functional sub-circuit exceeds a threshold;
  a control circuit coupled to the current monitor and configured to set the power switch to cut-off power to the second functional sub-circuit and to send a reset signal to the second functional sub-circuit if an overcurrent signal is received from the current monitor.

11. The system of claim 10, wherein the second functional sub-circuit is configured to be reset via an input signal.

12. The system of claim 10, wherein upon receiving a reset signal, the second functional sub-circuit is configured to one or more of: return to a known hardware and software state, power down, clear its memory, and drain power therein.

13. The system of claim 10, wherein the control circuit is configured to set the switch to re-apply power to the second functional sub-circuit after the reset signal is sent.

14. The system of claim 13, wherein the control circuit is configured to hold the second functional sub-circuit in reset mode for a period of time after re-applying power to the second functional sub-circuit.

15. The system of claim 10, wherein the switch is configured to control power to the second functional sub-circuit and not the first functional sub-circuit and wherein the first functional sub-circuit is configured to maintain normal operation while the second functional sub-circuit is resetting.

16. A method for mitigating radiation and temperature events, the method comprising:
  sensing a current draw of a circuit;
  cutting off power to the circuit if the current draw of the circuit exceeds a threshold; and
  sending a reset signal to the circuit if the current draw of the circuit exceeds the threshold.

17. The method of claim 16, comprising:
  at the circuit, performing one or more of: returning to a known hardware and software state, powering down, clearing memory, and draining power in response to receiving the reset signal.

18. The method of claim 16, comprising:
  maintaining normal operation of other circuits within an electronic device that share power with the circuit while cutting off power and resetting the circuit.

19. The method of claim 16, comprising:
  re-applying power to the circuit after sending the reset signal.

20. The method of claim 19, comprising:
  holding the circuit in reset for a period of time after re-applying power to the circuit.

* * * * *